FIG.
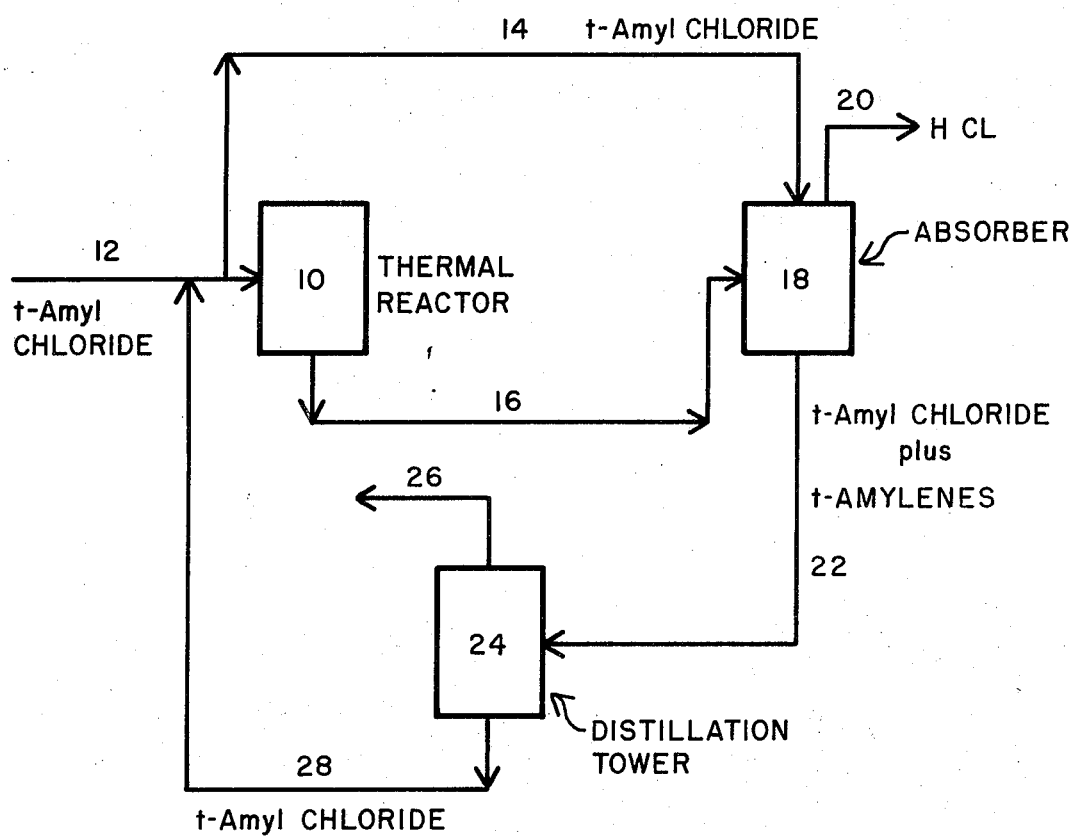

United States Patent Office 3,644,554
Patented Feb. 22, 1972

3,644,554
THERMAL RECOVERY OF ISOAMYLENES FROM TERTIARY AMYL CHLORIDE
Earl F. Harper, Oakmont, Clarence R. Murphy, Allison Park, and William L. Walsh, Glenshaw, Pa., assignors to Gulf Research & Development Company, Pittsburgh, Pa.
Filed Sept. 8, 1969, Ser. No. 856,089
Int. Cl. C07c 1/30
U.S. Cl. 260—677 XA          6 Claims

ABSTRACT OF THE DISCLOSURE

Isoamylene is recovered from tertiary amyl chloride by thermally decomposing from 50 to 80 weight percent of the tertiary amyl chloride and selectively absorbing the unreacted tertiary amyl chloride and isoamylene in a liquid tertiary amyl chloride solvent.

---

This invention relates to the recovery of isoamylenes from tertiary amyl chloride and in particular relates to the separation and recovery of isoamylenes from the $C_5$ fraction of a cracked gasoline.

The thermal and catalytic conversion of halo hydrocarbons to an unsaturated hydrocarbon and a hydrogen halide is known in the art. The catalytic processes are preferred in order to employ the use of lower temperatures together with shorter reaction times. The art also teaches that the use of catalysts allows for greater freedom from undesirable side reactions (United States Pat. 3,240,834). Thermal processes, however, are, of course, desirable as they eliminate the expense of a catalyst together with its handling and regeneration. A thermal process for the conversion of tertiary amyl chloride to produce isoamylene and anhydrous HCl has now been discovered which avoids the difficulties alleged in the prior art and greatly simplifies the recovery of the isoamylenes.

In accordance with the invention, an improved process has been discovered for obtaining isoamylene from tertiary amyl chloride which comprises:

thermally decomposing from 50 to 80 weight percent of said tertiary amyl chloride to HCl and isoamylenes;
passing the resulting mixture of unreacted tertiary amyl chloride, HCl and isoamylenes in the vapor phase immediately into a large excess of liquid tertiary amyl chloride solvent to selectively absorb the isoamylenes and tertiary amyl chloride from said mixture;
and separating the unabsorbed HCl from contact with the solvent.

The drawing is a simplified flow diagram of the steps of the process of this invention.

Referring to the drawing, tertiary amyl chloride enters thermal reactor 10 through line 12. The source of the tertiary amyl chloride is not critical. However, in one preferred embodiment of this invention, the tertiary amyl chloride is produced by the selective hydrochlorination of isoamylenes from the $C_5$ cut of a cracked gasoline, such as an FCC gasoline.

The separation and recovery of isopentenes (2-methyl-1-butene and 2-methyl-2-butene) from a $C_5$ fraction of FCC gasoline with sufficient purity for isoprene manufacture has been difficult to accomplish with conventional techniques of extraction, extractive distillation and fractionation. This separation has now effectively and efficiently been accomplished by selective hydrochlorination and dehydrochlorination in accordance with the invention.

The selective hydrochlorination can be effected in any suitable manner such as countercurrently contacting the mixture of $C_5$ olefins with a concentrated aqueous solution of hydrogen chloride in a tower. The excess hydrogen chloride may then be withdrawn as a relatively dilute aqueous solution. The hydrochlorination reactor is maintained under suitable conditions of temperature and pressure favoring the formation of the desired tertiary amyl chloride, and these conditions together with the possibility of using a catalyst, such as alumina, silica, etc., are well known in the art, and the exact conditions do not form a part of this invention. The mixture of unreacted $C_5$ olefins and tertiary amyl chloride is then separated and the resulting tertiary amyl chloride is a charge stock to the process of this invention.

The selective hydrochlorination is preferably achieved by passing the mixture of $C_5$ olefins in the liquid phase into a packed bed reactor pressured with anhydrous gaseous hydrogen chloride operated under mild conditions such as a temperature from 80° to 170° F., preferably 120° F.; a pressure of atmospheric to 200 p.s.i.g., preferably about 100 p.s.i.g.; and a liquid hourly space velocity of from 0.1 to 10 v./v./hr., preferably about one v./v./hr. The unreacted hydrocarbons and dissolved HCl can be separated from the formed tertiary amyl chloride by distillation.

Referring again to the drawing, the conditions in reactor 10 include a pressure from 100 mm. Hg to 30 p.s.i.g., preferably atmospheric pressure, and a temperature from 500° F. to 650° F., preferably from 550° F. to 625° F. The tertiary amyl chloride is fed to reactor 10 as a liquid but is immediately vaporized as it enters and passes through reactor 10 as a vapor. The residence time in the reactor is sufficient to result in a weight percent conversion of the tertiary amyl chloride from 65 to 80. The normal residence times are from 0.01 to 0.5 second, i.e. a liquid hourly space velocity from 0.1 to 5 v./v./hr., preferably from 0.5 to 2.0 v./v./hr.

The products exiting from reactor 10 are all in the vapor phase. It is important that the products be cooled down quickly and that the isoamylenes be separated immediately from the hydrogen chloride to prevent, as much as possible, recombination of the olefin and HCl to form tertiary amyl chlorides. Two of the critical features of the process of this invention are to (1) restrict the conversion in the thermal reactor 10 from about 65 to 80 weight percent and (2) to utilize liquid tertiary amyl chloride as a quenching liquid to cool the reaction products from reactor 10. It is critical to restrict the conversion in the thermal reactor 10 to from about 65 to 80 weight percent in order to prevent the formation of undesired side reaction products, such as isopentane, 3-methyl-1-butene and transpentene. It is critical to employ liquid tertiary amyl chloride as the quench liquid since it readily absorbs unreacted tertiary amyl chloride from reactor 10 and isoamylenes but fortuitously is a substantial non-solvent for anhydrous hydrogen chloride.

Further, by limiting conversion in the thermal reactor 10 to the range specified, side reaction products are virtually eliminated and theoretically complete conversion of the tertiary amyl chloride can be achieved by simple recycle of a portion of the tertiary amyl chloride without the need for a separate distillative procedure for the removal of a foreign quench solvent.

Thus, referring again to the drawing, the gaseous products from reactor 10 consisting of anhydrous HCl, isoamylenes and unreacted tertiary amyl chlorides are led through line 16 into absorber 18 where they are contacted with an excess of liquid tertiary amyl chloride which enters absorber 18 through line 14. The particular type of equipment used for the absorber 18 is not critical and absorption towers are well known in the industry. For example, using a suitable absorption tower, the tertiary amyl chloride in the liquid phase may be passed downwardly through the tower countercurrent to the rising stream of gaseous products entering through line 16. The conditions in absorption tower 18 are such as to permit substantially complete absorption of the unreacted tertiary amyl chloride and isoamylenes by the liquid tertiary amyl chloride while the anhydrous HCl is removed overhead through line 20. Suitable conditions in tower 18 include a temperature from 70° to 120° F., preferably from 80° to 100° F.; a pressure from atmospheric to 10 p.s.i.g., usually from atmospheric to 5 p.s.i.g.; and a volume ratio of liquid tertiary amyl chloride to total reaction products from reactor 10 of from 0.5:1 to 4:1, preferably from 1.5:1 to 2.5:1. The liquid tertiary amyl chloride containing the isoamylene is removed from absorber 18 through line 22 where it is sent to distillation tower 24 for removal of the isoamylenes overhead through line 26 and removal of tertiary amyl chloride from the bottom through line 28. The tertiary amyl chloride removed from distillation tower 24 through line 28 can be recycled to line 12 for reconversion in thermal reactor 10 or for recycling as absorber liquid through line 14 into absorber 18.

The invention will be further described with reference to the following experimental work.

A liquid $C_5$ fraction of FCC gasoline was contacted with anhydrous hydrogen chloride gas in a carbon steel vessel at mild conditions (preferred about 100 p.s.i.g., 120° F. and a liquid hourly space velocity of about one based on a feed containing about 45 weight percent 2-methyl-1-butene and 2-methyl-2-butene) to selectively hydrochlorinate the 2-methyl-1-butene and 2-methyl-2-butene.

The analysis of the liquid $C_5$ fraction of the FCC gasoline together with the analysis of the overhead and bottoms products from the hydrochlorination reactor are given in Table I below.

TABLE I

Composition of feed and the overhead and base products from the hydrochlorination of the pentene fraction of FCC gasoline

| Component | Feed, percent by wt. | Overhead product, percent by wt. | Base product, percent by wt. |
|---|---|---|---|
| 1-pentene | 4.4 | 7.10 | 0.0 |
| 2-methyl-1-butene | 18.9 | 0.50 | 0.4 |
| Trans-2-pentene | 17.9 | 30.90 | |
| Cis-2-pentene | 8.5 | 11.80 | 0.6 |
| 2-methyl-2-butene | 25.7 | 2.90 | |
| Isopentane | 15.5 | 26.30 | 0.0 |
| n-Pentane | 8.4 | 14.50 | 0.0 |
| Isoprene | 0.1 | | 0.0 |
| Cyclopentane | 0.6 | Trace | 0.0 |
| 1,2-pentadiene | | | 0.0 |
| t-Amyl chloride | | 6.00 | 95.0 |
| Unknown | | | 4.0 |
| Total | 100.0 | 100.00 | 100.0 |

Referring to Table I, it can be seen that the FCC feed has a large number of olefins and some paraffins, while the base product from the hydrochlorination reactor is 95 percent tertiary amyl chloride, the reaction product of 2-methyl-1-butene and 2-methyl-2-butene with anhydrous HCl.

A series of runs were made to thermally dehydrochlorinate the tertiary amyl chloride prepared as above. The results of these runs together with the conditions of reaction are shown on Table II below.

TABLE II

| Example number | 1 a b | 2 a b | 3 a b | 4 a b c | 5 d | 6 | 7 b c | 8 |
|---|---|---|---|---|---|---|---|---|
| Reactor conditions: | | | | | | | | |
| Temperature, °F | 600 | 606 | 604 | 647 | 553.0 | 449.5 | 702 | 609 |
| Pressure, p.s.i.g | (f) | (f) | (f) | (f) | 3.5 | (f) | (f) | 3.0 |
| Space velocity, vol/hr./vol | 1.0 | 1.9 | 3.8 | 1.9 | 1.0 | 1.0 | 0.9 | 1.0 |
| Feed, grams | 1120.0 | 1218.0 | 1483.0 | 2031.0 | 701.4 | 664.3 | 1043.0 | 662.7 |
| Percent conversion: | | | | | | | | |
| Based on chromatograph analysis per pass | 73.8 | 77.3 | 56.0 | | 79.2 | 12.8 | | 62.9 |
| Unreacted t-amyl chloride recovered, percent by weight | 33.7 | 39.1 | 37.4 | | 15.2 | 88.3 | | 23.16 |
| Composition of hydrocarbon, percent by weight: | | | | | | | | |
| Ethane | | | | | | | | 0.10 |
| Propane | | | | | | | | 0.10 |
| Isobutane | | | | | | (e) | | 0.10 |
| n-Butane | | | | | | | | 0.10 |
| Butene and isobutylene | | | | | | | (g) | |
| Trans-2-butene | | | | | | | (g) | |
| Cis-2-butene | | | | | | | | |
| Isopentane | | | | | | | | 1.00 |
| 3-methyl-1-butene | | | | | | | | 1.70 |
| n-Pentane | | | | | | | | |
| 1-pentene | | | | | | | | |
| 2-methyl-1-butene | 21.40 | 23.00 | 26.00 | 25.40 | | 11.76 | 28.70 | 22.10 |
| Trans-pentene | 0.40 | 0.50 | | | | | 0.30 | |
| Trans-2-pentene | | | | | | | | |
| Cis-pentene | | | | | | | | |
| Cis-2-pentene | | | | | | | | |
| 2-methyl-2-butene | 78.20 | 76.50 | 74.00 | 74.60 | | 88.24 | 63.20 | 77.90 |
| t-Amyl-chloride | | | | | | | | |
| Unknown-1 | | | | | | | | 3.40 |
| Unknown-2 | | | | | | | | 1.30 |
| Cyclopentene | | | | | | | | |
| Total | 100.00 | 100.00 | 100.00 | 100.00 | 100.00 | 100.00 | 100.00 | 100.00 |
| Dimer $C_{10}$ in recycle: percent by weight of feed | | | | | | | | 0.6 | a Reactor had Merusol oil to aid heat transfer.
b t-Amyl chloride used as absorption medium.
c Leak in rupture disk.
d Analytical results not completed.
e Sample for chromatograph contaminated.
f Atmospheric.
g Trace.

Referring to Table II, it can be seen that dehydrochlorination of tertiary amyl chloride can be effected with conversions of 50 to 80 weight percent per pass and 98 to 100 percent yield at 550° to 650° F. (Compare Examples 1–5 and 8.)

Temperatures in excess of 650° F. promote side reactions (Example 7), while at 450° F. the conversion dropped to an unacceptable 12 percent level (see Example 6). A comparison of Examples 5 and 8 shows a small amount of pentene dimer forms at 600° F. but not at 550° F. Thus, temperatures of about 550° F. are preferred for the dehydrochlorination step of the process of this invention.

The type of reactor to employ for the dehydrochlorination is not critical, but it should be such that excellent heat transfer is achieved. For example, an empty tube reactor can suitably be employed, care being taken to remove traces of resinous materials and polymers from the vaporized $C_5$ fraction before it enters the reactor. A preferred type of reactor is a packed reactor having a heat transfer liquid passing downwardly through the bed. The function of the heat transfer liquid is to not only maintain a uniform temperature throughout the reactor bed, but also to maintain any resinous materials or polymers formed during the reaction or possibly coming in with the feed in suspension and capable of being washed out of the reactor so that the reactor bed cannot be plugged. Suitable heat transfer liquids which can be employed in the dehydrochlorination reactor include heavy oils, such as Merusol oil, or a high molecular weight chlorinated paraffin. It is necessary for the heat transfer liquid to be a high boiling material so as to maintain it in the liquid phase in the reactor and so as to aid in ease of separation of the gaseous products coming from the hydrochlorination reactor from the heat transfer liquid by simple flashing.

Resort may be had to such variations and modifications as fall within the spirit of the invention and the scope of the appended claims.

We claim:

1. A process for obtaining isoamylene from tertiary amyl chloride comprising:
   thermally decomposing from 50 to 80 weight percent of said teritary amyl chloride to HCl and isoamylenes at a temperature from about 500° F. to 650° F.;
   passing the resulting mixture of unreacted tertiary amyl chloride, HCl and isoamylenes in the vapor phase immediately into a large excess of liquid tertiary amyl chloride solvent to selectively absorb the isoamylenes in tertiary amyl chloride from said mixture;
   and separating the unabsorbed HCl from contact with the solvent.

2. A process for obtaining isoamylenes from tertiary amyl chloride comprising:
   thermally decomposing from 50 to 80 weight percent of said tertiary amyl chloride to HCl and isoamylenes at a temperature from about 500° F. to 650° F.;
   passing the resulting mixture of unreacted tertiary amyl chloride, HCl and isoamylenes in the vapor phase immediately into a large excess of liquid tertiary amyl chloride solvent to selectively absorb the isoamylenes and tertiary amyl chloride from said mixture;
   separating the unabsorbed HCl from contact with the solvent;
   separating the isoamylenes from the liquid tertiary amyl chloride by distillation; and
   recycling at least a portion of the tertiary amyl chloride to said thermal decomposition step.

3. A method of separating isoamylenes from admixture with other close boiling hydrocarbons which comprises:
   selectively reacting the isoamylenes in said admixture with gaseous HCl to form tertiary amyl chloride;
   separating said tertiary amyl chloride from said admixture;
   thermally decomposing from 50 to 80 weight percent of said tertiary amyl chloride to HCl and isoamylenes at a temperature from about 500° F. to 650° F.;
   passing the resulting mixture of unreacted tertiary amyl chloride, HCl and isoamylenes in the vapor phase immediately into a large excess of liquid tertiary amyl chloride solvent to selectively absorb the isoamylenes in tertiary amyl chloride from said mixture; and
   separating the unabsorbed HCl from contact with the solvent.

4. A process according to claim 3 wherein at least a portion of the tertiary amyl chloride is recycled to said thermal decomposition zone.

5. A process according to claim 3 wherein said admixture is a $C_5$ cut of an FCC gasoline.

6. A process for obtaining isoamylene from tertiary amyl chloride comprising:
   thermally decomposing from 50 to 80 weight percent of said tertiary amyl chloride to HCl and isoamylenes at a temperature from about 500° F. to 650° F.; and
   passing the resulting mixture of unreacted tertiary amyl chloride, HCl and isoamylenes in the vapor phase immediately into a large excess of liquid tertiary amyl chloride solvent to selectively absorb the isoamylenes in tertiary amyl chloride from said mixture.

References Cited

UNITED STATES PATENTS

| | | | |
|---|---|---|---|
| 2,404,927 | 7/1946 | Schmerling et al. | 260—676 |
| 1,975,456 | 10/1934 | Hass et al. | 260—170 |
| 2,181,642 | 11/1939 | McMillan | 260—683 |
| 3,227,770 | 1/1966 | Burk et al. | 260—677 |
| 1,384,447 | 7/1921 | Gardner et al. | 260—677 Hal |
| 3,415,897 | 12/1968 | Gehrman | 260—677 |
| 2,466,092 | 4/1949 | Findlay | 260—677 A |
| 1,087,961 | 2/1914 | Masland et al. | 260—677 A |

FOREIGN PATENTS

| | | | |
|---|---|---|---|
| 989,254 | 4/1965 | Great Britain | 260—677 |

PAUL M. COUGHLAN, Jr., Primary Examiner

J. M. NELSON, Assistant Examiner